United States Patent Office 3,091,615
Patented May 28, 1963

3,091,615
DIBENZAZEPINYLALKYL PIPERAZINONES
John W. Cusic, Skokie, and Ernest Le Von, Morton Grove, Ill., assignors to G. D. Searle & Co., Chicago, Ill., a corporation of Delaware
No Drawing. Filed July 6, 1961, Ser. No. 122,111
4 Claims. (Cl. 260—268)

The present invention relates to a group of dibenzazepinylalkyl piperazinones. More particularly, it relates to a group of compounds having the following general formula

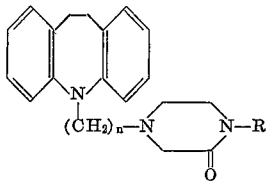

wherein $n$ is an integer greater than 1 and less than 4 and R is hydrogen or a lower alkyl radical containing up to 7 carbon atoms.

Also encompassed by this invention are the non-toxic salts of the aforementioned organic bases, as exemplified by the hydrochloride, hydrobromide, hydroiodide, tartrate, succinate, malate, acetate, citrate, ascorbate, nitrate, sulfate, phosphate, and sulfamate.

The compounds of this invention can be prepared by heating an appropriate N-(ω-haloalkyl)iminobibenzyl with piperazinone or an appropriate N-alkylpiperazinone in an inert solvent such as an alkanone. Alternately, the N-alkylpiperazinones of the present invention can be prepared by the alkylation of the appropriate dibenzazepinylalkyl piperazinone with sodamide and an alkyl halide.

The compounds of this invention posses valuable pharmacological properties. In particular, they inhibit cholesterol synthesis, as is shown by their inhibition of Triton-induced hypercholesterolemia in rodents. Some of the compounds also possess an anti-inflammatory activity as shown by their phenylbutazone-like effect on edematous conditions. The compounds also possess an anti-fungal activity as shown by inhibition of the growth of *Trichophyton mentagrophytes*. Safety and effectiveness of these compounds in human beings has not been established at this time.

The compounds which constitute this invention and their preparation will appear more fully from a consideration of the following examples which are given for the purpose of illustration only and are not to be construed as limiting the invention in spirit or in scope. In these examples quantities are indicated in parts by weight and temperatures in degrees centigrade (° C.).

Example 1

A mixture of 6 parts of 5-(2-chloroethyl)-10,11-dihydro-5H-dibenz[b,f]azepine, 2.5 parts of 2-piperazinone, 56 parts of triethanolamine and 8 parts of ethanol is heated on a steam bath for 15 hours. The cooled reaction mixture is filtered to remove precipitated triethanolamine hydrochloride and the hydrochloride is washed with alcohol. The solvent is evaporated from the filtrate and the residue is mixed with 440 parts of benzene and 500 parts of water. The benzene solution is washed with water and then extracted with 40 parts of 1 N hydrochloric acid. 500 parts of warm water is added to dissolve the hydrochloride which crystallizes. The aqueous extract is made alkaline and extracted with benzene. The benzene solution is washed, dried and concentrated to about 2.6 parts. The residue is dissolved in 20 parts of 3 N hydrochloric acid, filtered and cooled. The hydrochloride which precipitates is filtered and dried under reduced pressure to give 4-[2-(10,11-dihydro-5H-dibenz[b,f]azepin-5-yl)ethyl] - 2 - piperazinone hydrochloride, melting at about 246–249° C. with decomposition. The free base of this compound has the following formula

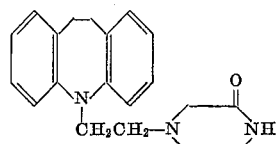

Example 2

A mixture of 14.3 parts of crude 5-(3-chloropropyl)-10,11-dihydro-5H-dibenz[b,f]azepine, 5.3 parts of 2-piperazinone, 7.5 parts of sodium iodide and 15 parts of anhydrous potassium carbonate in 405 parts of butanone is stirred and refluxed for 18 hours. The cooled mixture is filtered to remove inorganic salts and the solvent is evaporated from the filtrate. The residue is dissolved in benzene and washed with water. When the benzene solution is extracted with 100 parts of 1.5 N hydrochloric acid, the hydrochloride of the product separates as an oil. On standing, the oily material crystallizes and both the aqueous portion and the benzene portion are filtered to remove the precipitate. The precipitate is washed with benzene and dried before it is dissolved in 240 parts of boiling methanol. The methanol solution is filtered and diluted with 250 parts of dry ether. The product crystallizes on standing and is dried under reduced pressure to give 4-[3-(10,11-dihydro-5H-dibenz[b,f]azepin-5-yl)propyl] - 2 - piperazinone hydrochloride, melting at about 227–230° C. with decomposition. The free base of this compound has the following formula

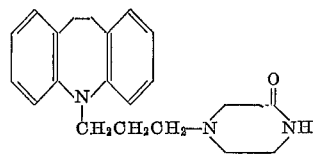

Example 3

10.1 parts of 4 - [3 - (10,11-dihydro-5H-dibenz[b,f]azepin-5-yl)propyl]-2-piperazinone hydrochloride is dissolved in water and alkalized with dilute sodium hydroxide solution. The resultant mixture is extracted with benzene, the benzene solution is dried and the solvent is evaporated. A solution of the residue in 260 parts of toluene is prepared and 1.5 parts of sodamide is added. The resultant mixture is stirred for 2 hours before a solution of 3.6 parts of methyl iodide in 60 parts of toluene is added portionwise. The solution is refluxed for 5 hours and then cooled and treated with water. The organic layer is separated, washed with water and dried over anhydrous sodium carbonate and filtered, and the solvent is evaporated. The residue is subjected to short-path distillation at reduced pressure to give 4-[3-(10,11-dihydro-5H - dibenz[b,f]azepin-5-yl)propyl]-1-methyl-2-piperazinone.

Substitution of 3.5 parts of n-butyl bromide for the methyl iodide used in the preceding procedure yields 4-[3-(10,11-dihydro - 5H - dibenz[b,f]azepin-5-yl)propyl]-1-butyl-2-piperazinone. This compound has the following formula

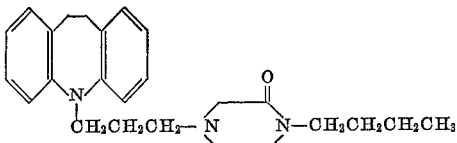

What is claimed is:
1. A compound of the formula

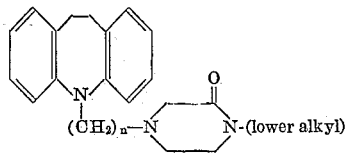

wherein $n$ is an integer greater than 1 and less than 4.

2. A compound of the formula

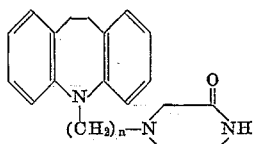

wherein $n$ is an integer greater than 1 and less than 4.

3. 4-[2-(10,11-dihydro-5H-dibenz[b,f]azepin-5-yl)-ethyl]-2-piperazinone.
4. 4-[3-(10,11-dihydro-5H-dibenz[b,f]azepin-5-yl)-propyl]-2-piperazinone.

References Cited in the file of this patent

UNITED STATES PATENTS

| | | |
|---|---|---|
| 2,787,617 | Cusic | Apr. 2, 1957 |
| 2,902,484 | Horclois | Sept. 1, 1959 |

FOREIGN PATENTS

| | | |
|---|---|---|
| 215,335 | Australia | June 11, 1958 |

OTHER REFERENCES

Hollister: Annals of Internal Medicine, volume 51, No. 5, November 1959, pages 1040–1041.